United States Patent Office 3,111,492
Patented Nov. 19, 1963

3,111,492
CHEMICAL TREATMENT OF FLOOD WATERS USED IN SECONDARY OIL RECOVERY
Samuel Steinberger, Brooklyn, N.Y., assignor to Onyx Chemical Corporation, a corporation of Delaware
No Drawing. Filed Nov. 6, 1958, Ser. No. 772,165
5 Claims. (Cl. 252—8.55)

This invention relates to the chemical treatment of flood waters used in secondary oil recovery and, more particularly, to the use of microbicides in flood waters to prevent corrosion of the subterranean piping system and plugging of the oil-bearing strata during flooding operations. The invention is based on the discovery that certain mixed N-alkyl 'inium halides, when incorporated in minute amounts in the injection flood waters used in secondary oil recovery, are unusually effective microbicides against the aerobic and anaerobic microorganisms which commonly corrode subterranean pipes and clog oil-bearing strata and sands during flooding operations. The invention provides an improved cationic quaternary nitrogen-containing heterocyclic microbicide which is particularly suitable for use in the chemical treatment of flood waters used in secondary oil recovery.

The recovery of the residual oil contained in partially depleted oil-bearing strata by flooding techniques, in which flood waters or brine are injected under high pressure through subterranean pipes into the oil-bearing formation to displace portions of the residual oil towards producing wells, is frequently complicated by the plugging and clogging of the oil-bearing sand pores due to the growth of certain aearobic and anaerobic bacteria. The growth of these bacteria, of which *Desulfovibrio desulfuricans*, *Serratia marcescens*, and *Pseudomonas fluorescens* are represensative, not only plug the sand faces of the oil-bearing strata but also liberate large quantities of hydrogen sulfide which, in turn, accelerates the corrosive action of the flood waters on the subterranean piping system. Various microbicides and bacteriostats have been employed in flood waters to inhibit the growth of microorganisms during flooding of subterranean oil-bearing formations, but generally have proved so prohibitively high in cost as to negate their usefulness or, more frequently, tend to react with certain ionic constituents of the flood waters, such as sulfate or carbonate ions, to form gelatinous precipitates. Treatment of the injection flood waters or brines used in secondary oil recovery with a minute quantity of the mixed N-alkyl 'inium halides of a coal-tar base residuum have been found to completely inhibit the growth of sulfide-forming bacteria in oil-bearing formations flooded with these chemically treated waters and represents the most inexpensive but effective method for preventing the plugging and clogging of oil-bearing strata during flooding operations.

These N-alkyl 'inium halides are the reaction product of an alkyl halide containing from 8 to 18 carbon atoms and a crude coal-tar base residuum remaining after the fractional distillation of quinoline from a tar base distillate having a boiling point temperature in the range of from 230° C. to 265° C., the crude coal-tar base residuum having an average combining weight, based on titration with standard acid, of from 135 to 160. Infrared analyses of the crude coal-tar base residuum used to form these cationic quaternary nitrogen-containing heterocyclic microbicides indicate that the residuum contains a minor amount of quinoline and major amounts of isoquinoline and quinaldine, and also indicates the presence of varying amounts of mono- and dimethyl quinolines and isoquinolines, depending upon the source of the crude tar base residuum.

Only very small quantities of the N-alkyl 'inium halides of the crude coal-tar base residuum are required in the injection flood waters to completely inhibit the growth of microorganisms in subterranean oil-bearing strata flooded with these chemically treated waters, for the various N-alkyl 'inium halides formed upon alkylation of the crude residuum, including the quinolinium, isoquinolinium, quinaldinium, and methyl- and dimethyl quinolinium and isoquinolinium halides, appear to exert a pronounced synergistic effect on the microbicidal properties of each other. In general, concentrations of the mixed N-alkyl 'inium halides as low as 5 parts per million are effective, but in many cases at least 15 to 20 parts per million should be employed to secure the full benefit of their presence in the injection flood waters. There appears to be no critical upper limit on the concentration of these cationic microbicides, but there is no advantage generally in using more than 100 parts per million, and in most cases substantially full benefit of their presence is achieved by adding from 5 to 20 parts per million to the injection flood waters or brines.

Accordingly, the invention contemplates the improvement, in a process for recovery of secondary oil deposits from oil-bearing strata by flooding, in which flood waters or brines are injected under high pressure through subterranean pipes into the oil-bearing strata to displace portions of the residual oil towards producing wells, of incorporating in the injected flood waters from 5 to 100 parts per million of a cationic quaternary nitrogen-containing heterocyclic microbicide consisting essentially of the mixed N-alkyl 'inium halides which are the reaction product of an alkyl halide containing from 8 to 18 carbon atoms and a crude coal-tar base residuum remaining after the fractional distillation of quinoline from a tar base distillate having a boiling point range of from 230° C. to 265° C., the crude coal-tar base residuum having an average combining weight, based on titration with standard acid, of from 135 to 160 and containing a minor amount of quinoline and major amounts of isoquinoline and quinaldine in addition to varying amounts of the mono- and dimethyl quinolines and isoquinolines.

The cationic quaternary nitrogen-containing heterocyclic microbicides of the invention are prepared by reacting the alkyl halide with the crude coal-tar base residuum, preferably in the presence of an inert solvent, such as ethylene glycol, xylene, toluene, or benzyl alcohol. The alkyl halides used to prepare the microbicide may be conveniently prepared by passing an anhydrous hydrogen halide gas such as dry hydrogen chloride, through a heated mixture of fatty alcohols in the presence of a catalytic amount of a Lewis acid, such as zinc chloride. These alkyl halides need not be purified, for the bacteriological properties of microbicides prepared from a mixture of crude alkyl halides, such as crude coconut or lauryl chloride (which contains myristyl chloride in addition to other alkyl chlorides), are identical to those prepared from rectified alkyl halides.

The crude coal-tar residuum used to prepare the cationic microbicides of the invention is that residue which remains after the fractional distillation of quinoline from a tar base distillate having a boiling point temperature range of from 230° C. to 265° C. The average combining weight of these residuums, based on titration with standard acid, is from 135 to 160, further rectification producing a fraction having an average combining weight of from 135 to 160. Infrared analyses of residuums obtained from several commercial sources show them to contain generally less than 3 percent by weight of quinoline, from about 20 to 30 percent by weight of isoquinoline, and from about 15 to 25 percent by weight of quinaldine, the remaining components including varying amounts of the mono- and dimethyl quinolines and isoquinolines, depending upon the source of the crude residuum.

3

To prepare the cationic microbicides of the invention, the alkyl halide is heated with a small stoichiometric excess of the crude coal-tar base residuum to a temperature of from 140° C. to 170° C., preferably using an inert solvent, such as ethylene glycol, to obtain a homogeneous mixture as the reaction proceeds. The course of the reaction is conveniently followed by argentometric titration of liberated halide ions, and frequently proceeds to from 95 to 99 percent of theory, usually requiring from about two to about ten hours, at which point heating may be discontinued. For some reason, the use of an inert solvent accelerates the rate of reaction, but no solvent need be used if a more viscous reaction product is desired. The reaction products are readily miscible with water in all proportions, forming clear solutions upon further dilution with water.

The following specific examples are illustrative of the preparation and properties of the cationic quaternary nitrogen-containing heterocyclic microbicides of the invention and the use of these microbicides in the chemical treatment of flood waters employed in secondary oil recovery.

*Example I*

Crude lauryl chloride was prepared by passing anhydrous chloride gas into a heated mixture of topped coconut fatty alcohols containing 1 percent by weight of zinc chloride. Upon completion of the reaction, at which point the absorption of hydrogen chloride had ceased and no further water was evolved, the reaction product was washed with water to remove the zinc chloride and any entrained hydrogen chloride, and the water layer then discarded. The crude, unrectified lauryl chloride was found, upon analysis, to contain 14.97 percent of reactive chlorine and have a combining weight of 237, the conversion of the crude lauryl alcohol to the coconut or lauryl chloride representing over 92 percent of theory.

A crude coal-tar base residuum, remaining after the fractional distillation of quinoline from a tar base distillate (B.P. range 238° to 265° C.), was distilled in vacuo and 92.5 percent by weight of the charge recovered over the temperature range of from 100° to 114° C. at about 7 mm. Hg. The rectified tar base residuum, composed mainly of isoquinoline and quinaldine (2-methylquinoline) together with varying amounts of mono- and dimethyl quinolines and isoquinolines, had an average combining weight of 150, based on titration with standard acid.

The quaternary microbicide was then prepared by heating a mixture of 3250 pounds (13.71 moles) of the crude, unrectified lauryl chloride and 2302 pounds (15.31 moles) of the rectified tar base residuum dissolved in 2800 pounds of ethylene glycol to a temperature of from 140° to 170° C., the course of the quaternization being followed by argentometric titration of the liberated chloride ions. After the reaction had proceeded to 96 percent of theory, based on the argentometric titration, heating of the reaction mixture was discontinued and a sufficient amount of water added to make a 50 percent solution of the quaternary in the resultant ethylene glycol-water solvent pair. This solution, which possessed a deep cherry red color, was miscible with water in all proportions without any precipitation or oiling out of the quaternary.

Bacteriological assays of the reaction product, using the official test methods of the Association of Official Agricultural Chemists, showed the quaternary microbicide to have a phenol coefficient of 300 against *Staphylococcus aureus* and 200 against *Salmonella typhosa*. Further bacteriological tests, employing the official method of the Subcommittee on Biological Analysis of Injection Waters To Be Used for Waterflood Purposes of the American Petroleum Institute, which was adopted in 1958, indicated that 15 to 20 parts per million of the cationic quaternary nitrogen-containing heterocyclic microbicide of the invention served as an effective bacteriostat, the effectiveness being confirmed in field testing of the microbicide in secondary oil recovery water-flooding operations.

*Example II*

A crude, unrectified coal-tar base residuum, remaining after the fractional distillation of quinoline from a tar base distillate which boiled over the temperature range of from 230° to 265° C., was titrated with standard acid and found to have a combining weight of 145. This crude residuum was then reacted with a crude, unrectified lauryl chloride having an average combining weight of 237, using a mole ratio of 1.12:1.00 of residuum to lauryl chloride and reaction conditions identical to those described in Example I with the sole exception that the reaction was continued until 97.5 percent of the theoretical amount of the quaternary microbicide had formed. The reaction product, although dark in color, was completely miscible with water in all proportions, yielding clear, aqueous solutions upon further dilution.

The addition to injection flood waters of from 5 to 100 parts per million of this cationic quaternary nitrogen-containing heterocyclic microbicide is effective in preventing the plugging and clogging of oil-bearing sands which are flooded with this water in secondary oil recovery operations.

*Example III*

A crude lauryl chloride, prepared by the method described in Example I, was distilled, yielding a rectified lauryl chloride containing 15.88 percent by weight of reactive chlorine. This rectified lauryl chloride was then reacted with a rectified coal-tar base residuum having an average combining weight, based on titration with standard acid, of 145, using the same reaction conditions as are described in Example I. The microbicidal properties of the resultant reaction product had the same magnitude of potency as the reaction product of Example I, which was prepared from crude, unrectified lauryl chloride and a crude, unrectified coal-tar base residuum.

*Example IV*

Anhydrous hydrogen chloride gas was passed into a heated mixture of fatty alcohols, composed mainly of myristyl and palmityl alcohols, in the presence of 1 percent by weight of zinc chloride. After the absorption of hydrogen chloride had ceased, at which point no further water was evolved, the reaction product was washed with cold water to remove the zinc chloride and any entrained hydrogen chloride, yielding a crude myristyl-palmityl chloride mixture which contained 11.45 percent by weight of chlorine.

A crude coal-tar base residuum, remaining after the fractional distillation of quinoline from a tar base distillate having a boiling point range of from 230° to 265° C., was titrated with standard acid and found to have an acid number, or average combining weight of 145. Distillation of the crude residuum at temperatures between 235° and 242° C. yielded a rectified tar base residuum having an average combining weight of 150.

The rectified tar base residuum was then reacted with the crude alkyl chloride mixture, composed mainly of myristyl and palmityl chlorides, using the same reaction conditions and mole ratios as are described in Example I, the reaction being carried to over 96 percent completion based on argentometric titration of liberated chloride ion. The reaction product, consisting essentially of a solution in ethylene glycol of the mixed N-myristyl and N-palmityl 'inium chlorides of the tar base residuum, notably the N-myristyl and N-palmityl isoquinolinium and quinaldinium chlorides, is miscible with water in all proportions, forming clear solutions upon dilution. Treatment of injection flood waters, including both fresh water and brine, with from 5 to 100 parts per million of the reaction product (based on the concentration of quaternary microbicide in the reaction product) is effective in preventing plugging or clogging of oil-bearing formations during secondary oil recovery operations by flooding.

Although the foregoing examples have shown the use of the cationic quaternary nitrogen-containing heterocyclic microbicides of the invention in the chemical treatment of flood waters and brines used in secondary oil recovery, these microbicides may also be used to treat or condition other types of process water in which the growth of microorganisms must be regulated or even completely inhibited.

I claim:

1. In a process for recovering secondary oil deposits from oil-bearing strata by flooding, in which flood waters are injected under pressure through subterranean pipes into the oil-bearing strata to displace portions of the residual oil towards producing wells, the improvement which comprises incorporating in the injected flood waters from 5 to 100 parts per million of a cationic quaternary nitrogen-containing heterocyclic microbicide consisting essentially of the mixed N-alkyl 'inium halides which are the reaction product of an alkyl halide, containing from 8 to 18 carbon atoms and a crude coal-tar base residuum remaining after the fractional distillation of quinoline from a tar base distillate having a boiling point range of from 230° C. to 265° C., the crude coal-tar base residuum having an average combining weight, based on titration with standard acid, of from 135 to 160 and containing a minor amount of quinoline and major amounts of isoquinoline and quinaldine and further containing mono- and dimethyl quinolines and isoquinolines.

2. In a process for recovering secondary oil deposits from oil-bearing strata by flooding, in which flood waters are injected under pressure through subterranean pipes into the oil-bearing strata to displace portions of the residual oil towards producing wells, the improvement which comprises incorporating in the injected flood waters from 5 to 100 parts per million of a cationic quaternary nitrogen-containing heterocyclic microbicide consisting essentially of the mixed N-alkyl 'inium chlorides which are the reaction product of an alkyl chloride containing from 8 to 18 carbon atoms and a crude coal-tar base residuum remaining after the fractional distillation of quinoline from a tar base distillate having a boiling point range of from 230° C. to 265° C., the crude coal-tar base residuum having an average combining weight, based on titration with standard acid, of from 135 to 160 and containing a minor amount of quinoline and major amounts of isoquinoline and quinaldine and further containing mono- and dimethyl quinolines and isoquinolines.

3. In a process for recovering secondary oil deposits from oil-bearing strata by flooding, in which flood waters are injected under pressure through subterranean pipes into the oil-bearing strata to displace portions of the residual oil towards producing wells, the improvement which comprises incorporating in the injected flood waters from 5 to 100 parts per million of a cationic quaternary nitrogen-containing heterocyclic microbicide consisting essentially of the mixed N-lauryl 'inium halides which are the reaction product of a crude lauryl halide and a crude coal-tar base residuum remaining after the fractional distillation of quinoline from a tar base distillate having a boiling point range of from 230° C. to 265° C., the crude coal-tar base residuum having an average combining weight, based on titration with standard acid, of from 135 to 160 and containing a minor amount of quinoline and major amounts of isoquinoline and quinaldine and further containing mono- and dimethyl quinolines and isoquinolines.

4. In a process for recovering secondary oil deposits from oil-bearing strata by flooding, in which flood waters are injected under pressure through subterranean pipes into the oil-bearing strata to displace portions of the residual oil towards producing wells, the improvement which comprises incorporating in the injected flood waters from 5 to 100 parts per million of a cationic quaternary nitrogen-containing heterocyclic microbicide consisting essentially of the mixed N-lauryl and N-myristyl 'inium chlorides which are the reaction product of a crude lauryl chloride containing myristyl chloride with a crude coal-tar base residuum remaining after the fractional distillation of quinoline from a tar base distillate having a boiling point range of from 230° C. to 265° C., the crude coal-tar base residuum having an average combining weight based on titration with standard acid, of from 135 to 160 and containing a minor amount of quinoline and major amounts of isoquinoline and quinaldine and further containing mono- and dimethyl quinolines and isoquinolines.

5. In a process for recovering secondary oil deposits from oil-bearing strata by flooding, in which flood waters are injected under pressure through subterranean pipes into the oil-bearing strata to displace portions of the residual oil towards producing wells, the improvement which comprises incorporating in the injected flood waters from 5 to 100 parts per million of a cationic quaternary nitrogen-containing heterocyclic microbicide consisting essentially of a solution in an ethylene glycol-water solvent pair of the mixed N-lauryl and N-myristyl 'inium chlorides which are the reaction product of a crude lauryl chloride containing myristyl chloride with a crude coal-tar base residuum remaining after the fractional distillation of quinoline from a tar base distillate having a boiling point range of from 230° C. to 265° C., the crude coal-tar base residuum having an average combining weight, based on titration with standard acid, of from 135 to 160 and containing a minor amount of quinoline and major amounts of isoquinoline and quinaldine and further containing mono- and dimethyl quinolines and isoquinolines.

References Cited in the file of this patent

UNITED STATES PATENTS

| | | |
|---|---|---|
| 2,037,762 | Cole | Apr. 21, 1936 |
| 2,104,728 | Bertsch et al. | Jan. 11, 1938 |
| 2,435,458 | Mosher et al. | Feb. 3, 1948 |
| 2,446,796 | Van Campen et al. | Aug. 10, 1948 |
| 2,692,231 | Stayner et al. | Oct. 19, 1954 |
| 2,733,206 | Prussick et al. | Jan. 31, 1956 |
| 2,744,901 | Nabenhauer et al. | May 8, 1956 |
| 2,802,784 | Nowak et al. | Aug. 13, 1957 |
| 2,814,593 | Beiswanger et al. | Nov. 26, 1957 |
| 2,867,279 | Cocks | Jan. 6, 1959 |

UNITED STATES PATENT OFFICE

CERTIFICATE OF CORRECTION

Patent No. 3,111,492 November 19, 1963

Samuel Steinberger

It is hereby certified that error appears in the above numbered patent requiring correction and that the said Letters Patent should read as corrected below.

Column 3, line 25, before "chloride gas" insert -- hydrogen --.

Signed and sealed this 26th day of May 1964.

(SEAL)
Attest:

ERNEST W. SWIDER
Attesting Officer

EDWARD J. BRENNER
Commissioner of Patents